United States Patent [19]
Migliano

[11] 3,990,592
[45] Nov. 9, 1976

[54] SCOOTER JACK

[76] Inventor: Clemente A. Migliano, 1764 Slocum St., Hewlett, N.Y. 11557

[22] Filed: Apr. 21, 1975

[21] Appl. No.: 570,343

[52] U.S. Cl. .............................. 214/330; 214/334; 254/133 R; 254/134; 280/47.34
[51] Int. Cl.² ......................................... B60P 3/06
[58] Field of Search ...................... 254/133 R, 134; 280/47.34, 79.1 A; 214/330, 331, 332, 334

[56] References Cited
UNITED STATES PATENTS

| | | | |
|---|---|---|---|
| 1,695,183 | 12/1928 | Downey | 280/79.1 A |
| 2,505,187 | 4/1950 | Juergens | 254/134 |
| 2,556,006 | 6/1951 | Slack | 254/133 R |
| 3,214,042 | 10/1965 | Westrum | 214/330 |
| 3,662,911 | 5/1972 | Harman | 214/334 |

Primary Examiner—Robert G. Sheridan
Assistant Examiner—Lawrence J. Oresky
Attorney, Agent, or Firm—Bauer, Amer & King

[57] ABSTRACT

A lift device for the front wheel of a tubular framed three wheeled scooter includes a jack. A cantilever arm has one end attached to the jack with the arm constrained to move in essentially a vertical direction. A pin is attached to the other end of the arm. The pin is adapted to fit into a portion of the tubular frame adjacent the front wheel to effect a lifting of same by operation of the jack.

An optional carriage is provided to receive the front wheel and allow the scooter to be easily moved.

5 Claims, 4 Drawing Figures

SCOOTER JACK

FIELD OF THE INVENTION

This invention relates to a mechanical jack and, more particularly, to a service jack adapted for use with a three wheeled scooter.

BACKGROUND OF THE INVENTION

Three wheeled scooters find wide application in law enforcement where, because of their relative agility and economy of operation, they find use in enforcing parking regulations. Then too, to some extent, these three wheeled scooters are used as recreational vehicles and business vehicles.

However, a particularly irksome problem arises when one of these vehicles develops a front wheel flat. The front end of the three wheeled scooter is devoid of a bumper of the type used on automobiles which are expressly adapted for lifting the vehicle. Further still, the tubular superstructure or chassis comprising the frame of these scooters makes them entirely incompatible with conventional jacks. Consequently, it is not uncommon to find that several workers need be sent to bring or tow the scooter to a garage for service. The cost of this manpower, particularly to a municipality, is significant.

OBJECTS OF THE INVENTION

It is therefore an object of the present invention to provide a jack for a three wheeled scooter.

It is another object of the present invention to provide a front wheel jack for use on a three wheeled scooter which requires only a single worker for operation.

It is a further object of the present invention to provide a front wheel jack and movable dolly with the latter adapted to receive the front wheel of a three wheeled scooter.

It is a still further object of the present invention to provide a portable jack and carriage for the front wheel of a three wheeled scooter wherein the jack is fabricated from readily available parts and is therefore easy to construct and inexpensive to manufacture.

Other objects and features of the present invention will become apparent from the following detailed description considered in connection with the accompanying drawing. It is to be understood however that the drawing is designed for purposes of illustration only and not as a definition of the limits of the invention for which reference should be made to the appending claims.

BRIEF DESCRIPTION OF THE DRAWING

In the drawing wherein the same reference numeral denotes the same element through the several views.

SUMMARY OF THE INVENTION

Figure 1:
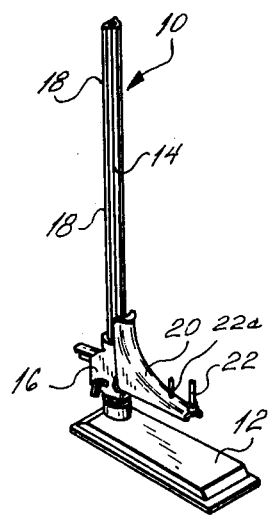
FIG. 1 is a perspective view of the jack of the present invention.

Generally the present invention includes a jack assembly formed with a unique pin arrangement. The jack is defined by a cantilever arm having one end coupled to the jack's lift mechanism while the other end of the arm supports the pin. The pin fits into a portion of the tubular frame of the scooter so that by activating the lift mechanism, the cantilever arm and hence the pin is caused to climb the jack standard thus lifting the front end of the scooter. The front wheel can then be dropped and replaced. Alternatively, the present invention includes a carriage for placement under the front wheel when the wheel is in the jacked up configuration. The carriage is defined by a trough that is adapted to receive this wheel when same is lowered thereonto. In this mode, the scooter can be towed to a repair station. Either alternative requires only a single worker.

DETAILED DESCRIPTION OF THE DRAWING

In detail now and turning to FIG. 1 there is shown a perspective view of the inventive jack. The same is generally indicated by reference numeral 10 and includes a base 12 essentially of elongated rectangular configuration. A jack standard or lift column 14 is on one end conventionally fastened to base 12 by, for example, incorporating a socket part onto the base to receive one end of the jack as shown. To provide stability to the base and standard during operation of the jack as will be explained below, standard 10 is attached to base 12 adjacent one lateral edge thereof with these two elements defining essentially an L configuration. Jack 10 further includes a ratchet operated lift mechanism 16 that cooperates with a plurality of lift detents 18 on column 14 allowing the mechanism to climb the column as will be hereinafter described.

A cantilever arm 20 is on one end attached to lift mechanism 16. Arm 20 can be rigidly attached to the mechanism or detachably affixed to the same, the only criteria for this attachment is that the arm be rigidly suspended from the mechanism when a downward load is applied thereon. The other and free end of arm 20 carries pin means 22 that projects upwardly from the arm as shown and the operation of which will be likewise explained below.

It is to be understood that the structure shown for jack 10 is illustrative only. Many other jack constructions are available such as screw jacks, hydraulic jacks, thread operated pivotal link jacks and the like.

Figure 2:
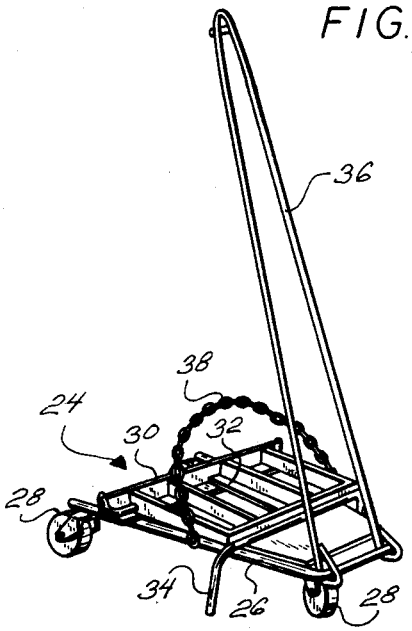
FIG. 2 is a perspective view of the carriage according to the present invention.

Turning now to FIG. 2 there is shown a perspective view of the inventive carriage assembly. The carriage, indicated generally by reference numeral 24, includes a frame 26 to the underside of which is attached a triangular array of caster wheels 28 defined by a leading nose wheel. A scooter wheel carrying platform 30 is affixed across the other and top side of the carriage. The platform includes a wheel receiving trough 32 adapted to receive the front wheel of the scooter. By way of illustration, trough 32 will be typically made of 6.35 cm (2.5 inches) angle iron having an inside width of approximately 17.8 cm (7 inches), an inside length of approximately 30.5 cm (12 inches) and a height of 6.35 cm (2.5 inches). Since the angle iron is 6.35 cm (2.5 inches) on each side, the sides of the angle iron in the plane of platform 30 comprise a landing area for the front wheel of the scooter although the inside edges of the iron define a central rectangular void 21.6 cm (8.5 inches) by 10.2 cm (4 inches).

An optical stabilizer bar 34 is attached to carriage 24 rearwardly of the carriage nose wheel as shown. Each end of bar 34 is bent downwardly so as to confront the ground and yet be spaced slightly thereabove. As is apparent, the bar prevents the carriage from tipping during operation of the same as will be described shortly. Of course the array of wheels 28 on carriage 24 can assume other configurations. For example four such wheels can be employed with two rigidly fixed wheels in the rear and two caster wheels in the front. This quadralateral wheel arrangement has inherent stability and eliminates the need for stabilizer bar 34.

A handle 36 is attached to the carriage and so is a safety chain 38. The former is used in pulling the carriage and the latter is optionally supplied for locking the scooter thereto.

Figure 3:
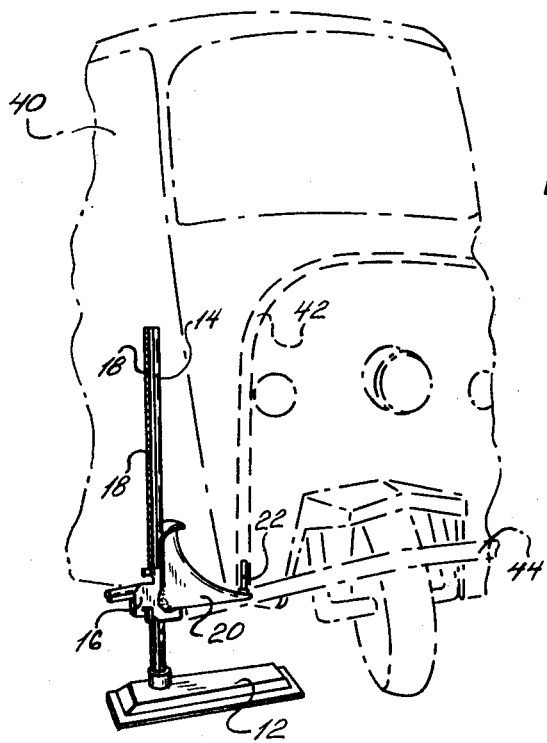
FIG. 3 shows use being made of the jack of FIG. 1.
Figure 4:
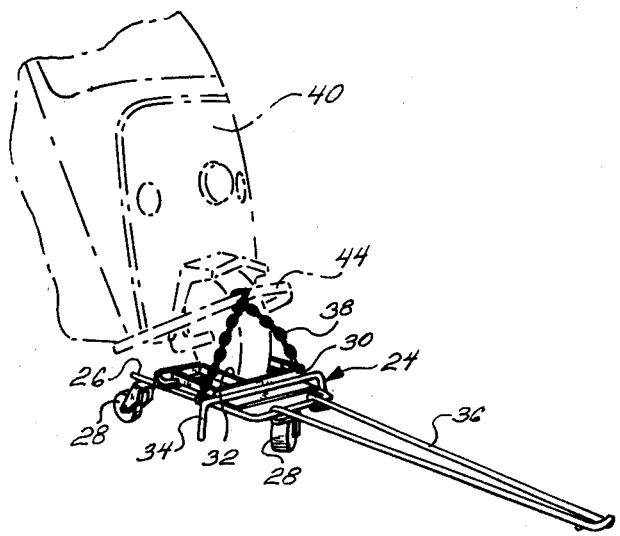
FIG. 4 shows the scooter front wheel on the carriage of FIG. 2 allowing moving of the former by pulling on the latter.

Operation of the inventive jack can best be understood with reference to FIGS. 3 and 4.

In FIG. 3 jack 10 with protruding cantilever arm 20 and pin means 22 is brought up under the right or left front corner of scooter 40, the scooter being indicated in phantom. As noted previously scooter 40 has a tubular frame, the front part of which, 42, is U-shaped. The jack is orientated so that pin 22 is inserted into the end of tube 42 on either the right or left tube side, the left side being shown for purposes of illustration. An elongated actuation handle 44, as is conventionally available, is inserted in lift mechanism 16 causing the same, arm 20 and pin 22 to lift the scooter front end as the mechanism climbs jack standard 14. After the scooter front end is raised the front wheel thereof can be conveniently "dropped."

In certain instances the front scooter wheel may be completely flat or the adjacent ground terrain so contoured that it is difficult if not substantially impossible to insert pin 22 into either end of U-shaped tube 42. If such is the case, pin 22 is placed against a portion of the inside face of scooter "bumper" 44. Mechanism 16 is activated and caused to climb standard 14. After sufficient ground clearance is obtained allowing pin 22 to enter either end of tube 42, a block or stone (not shown) is temporarily placed under the scooter chassis. Mechanism 16 is then lowered causing the scooter to come to rest on the block. Jack 10 is then brought up to the front end of the scooter and pin 22 inserted in either end of tube 42. Mechanism 16 is then upwardly operated as aforesaid causing the scooter front end to lift allowing exchange of the scooter front wheel and removal of the block.

Instead of changing the scooter wheel "on the spot" it may be advantageous to return the scooter to the shop. Thus in FIG. 4, carriage 24 is shown in operation after the carriage is positioned under the front scooter wheel during the lifting thereof as explained above. The landing area of trough 32 which is formed by the 6.35 cm (2.5 inches) sides of the angle iron is sufficiently wide to receive the front wheel after the same is lowered onto the trough. Chain 38 is then wrapped around bumper 44 locking the scooter front end to carriage 24. The scooter can then be towed by pulling on handle 36.

Of course various pin arrangements are available for pin means 22. Thus, and now referring back to FIG. 1, it may be advantageous to provide a relatively smaller pin 22a in addition to pin 22. Pin 22a might be used in cases where a tire flat and ground terrain combine to make it nearly impossible to insert larger pin 22 under the scooter bumper for the temporary lifting thereof and imposition of the block as described above. Thus, arm 20 can be placed laterally to the scooter front bumper while positioning pin 22a under a curved portion thereof. Pin 22a then acts to confine the bumper on the arm during the aforesaid temporary lifting of the scooter.

Then again, it is readily apparent that pin 22 is sized to fit snuggly in chassis tube 42 to prevent the tube from slipping off of the pin. And, it has been found that making pin 22 approximately 4 inches in height provides adequate stability for tube 42 when the tube is raised on pin 22 as aforesaid. It is to be understood that chassis tube 42 can also be a short section of tubing fixed to the bumper. Preferably two such pieces of tubing on opposed lateral ends of either the front or rear bumpers can then be used to lift the scooter in combination with pin 22 to permit the changing of tires.

While only a few embodiments of the present invention have been shown and described it is to be understood that many changes and modifications can be made hereto without departing from the spirit and scope hereof.

What is claimed is:

1. The combination of a three-wheel scooter having a tubular frame in front of said scooter, said frame including a vertical downwardly open end of said tubular frame and a lift device and movable carriage for the front wheel of the said tubular framed three-wheeled scooter comprising:
   a. jack means;
   b. a cantilever arm attached to said jack means at one end, the opposite end being a free end and operable to move in essentially a vertical direction;
   c. pin means attached to the free end of said arm and adapted to fit into the open end portion of the scooter tubular frame adjacent the front wheel thereof to effect a lifting of same by operation of said jack means; and
   d. a movable carriage adapted for placement under the front wheel after the same is lifted by operation of said jack means, said carriage defined by wheel means attached to one side thereof and on which said carriage rolls, a supporting platform including a front wheel receiving trough attached to the other side of said carriage with said trough sized to capture the scooter front wheel after the same is lowered onto said trough whereby pulling on said carriage effects movement of the scooter.

2. The combination of claim 1, said jack means having an elongated rectangular base to stabilize the last mentioned means during the operation thereof.

3. The combination of claim 2, said jack means comprising a rigid jack standard on one end attached to said base, and a ratchet operated lift mechanism adapted to climb said jack standard and support said arm in cantilever manner.

4. The combination of claim 1, a stabilizer bar attached to the carriage to prevent the same from tipping, a chain attached to the carriage to lock the scooter front wheel in said trough during movement of said carriage, said carriage further including a handle attached thereto to facilitate the moving thereof.

5. The combination of claim 1, including an additional spaced pin which is relatively shorter than the other said pins means with the shorter one thereof adapted for placement contiguous to the scooter bumper to stabilize the same on said arm.

* * * * *